July 15, 1958 — K. ROZECK — 2,842,989

RIVETING MACHINE

Filed Sept. 7, 1955 — 3 Sheets-Sheet 1

WITNESS:
E.F. Zbinden

INVENTOR:
Kurt Rozeck

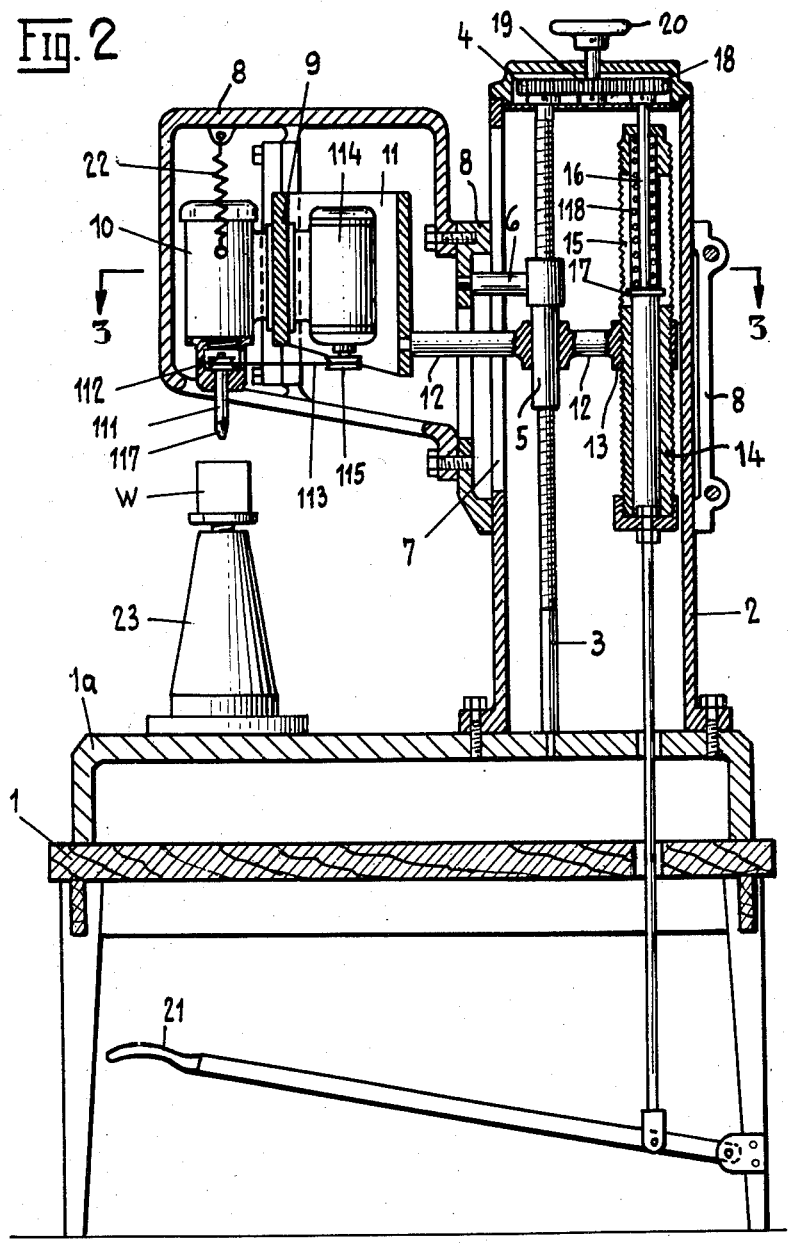

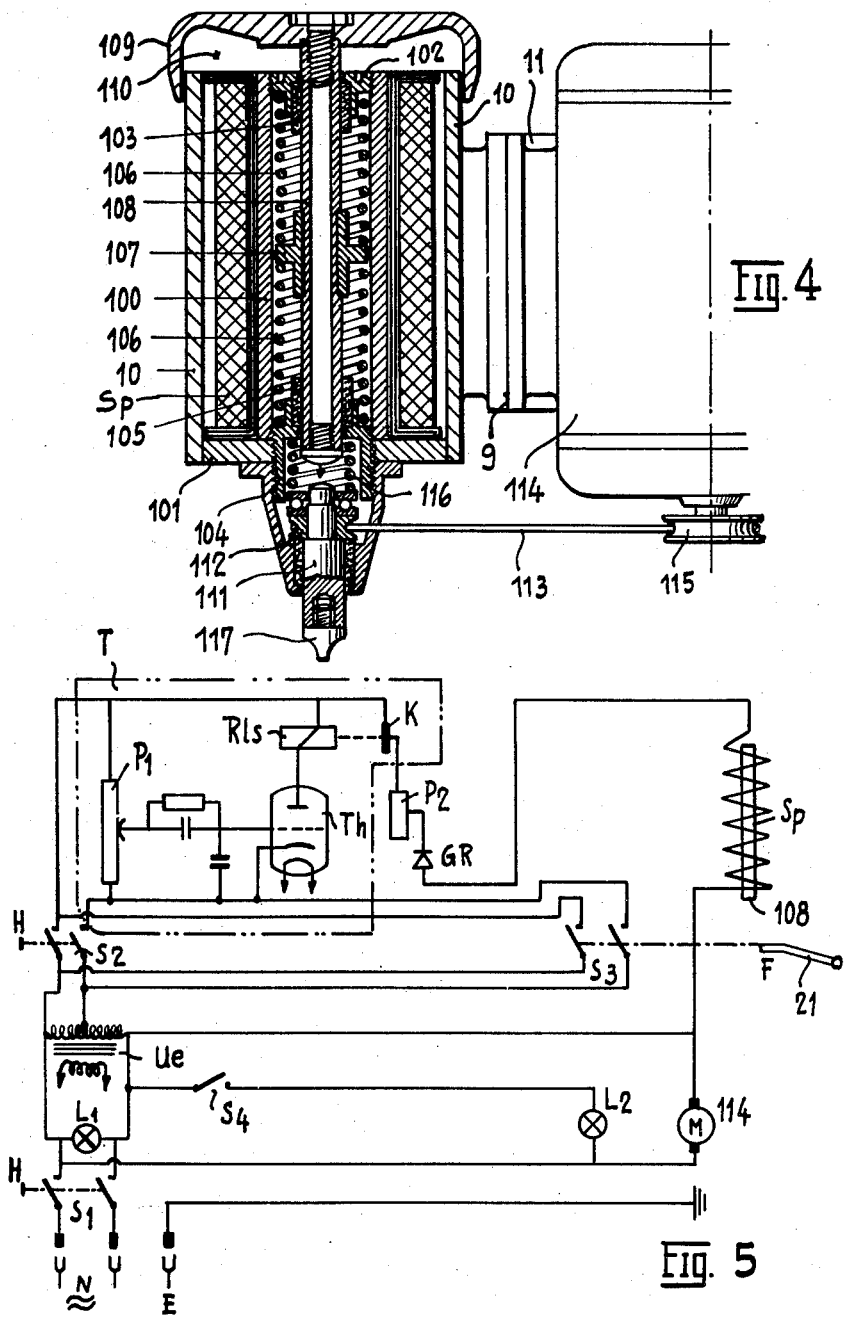

United States Patent Office 2,842,989
Patented July 15, 1958

2,842,989
RIVETING MACHINE

Kurt Rozeck, Brunnen, Switzerland, assignor to Kumag A. G., Maschinenfabrik, Zurich, Switzerland Application September 7, 1955, Serial No. 532,948

Claims priority, application Switzerland May 25, 1955

1 Claim. (Cl. 78—53)

The invention relates to a riveting machine and has the primary object of providing a machine of this kind which is of improved efficiency and ease of operation, and the electric control members of which are well protected from the vibrations inherent to a machine of this kind.

With this and other objects in view I provide a riveting machine comprising in combination: a machine base, a riveter head adjustably supported by said base, an electromagnetic vibrator operatively connected to the said riveter head and imparting vibratory movements to the same, a motor operatively connected to the said riveter head and imparting rotation to the same about an axis lying in the direction of the said vibratory movements, and electric control members conductively connected to the said electromagnetic vibrator and selectively adjusting the period and amplitude of the vibratory movements thereof.

These and other objects and features of my said invention will be clearly understood from the following description of a preferred embodiment thereof given by way of example with reference to the accompanying drawings, in which:

Fig. 2 is a side elevation theerof in section on the line 2—2 of Fig. 1.

Fig. 4 is a vertical section of the electromagnetic vibrator for the operation of the riveter head, on an enlarged scale.

Fig. 5 is an electric wiring diagram for the riveting machine according to Figs. 1 to 4.

Figures 1, 3:
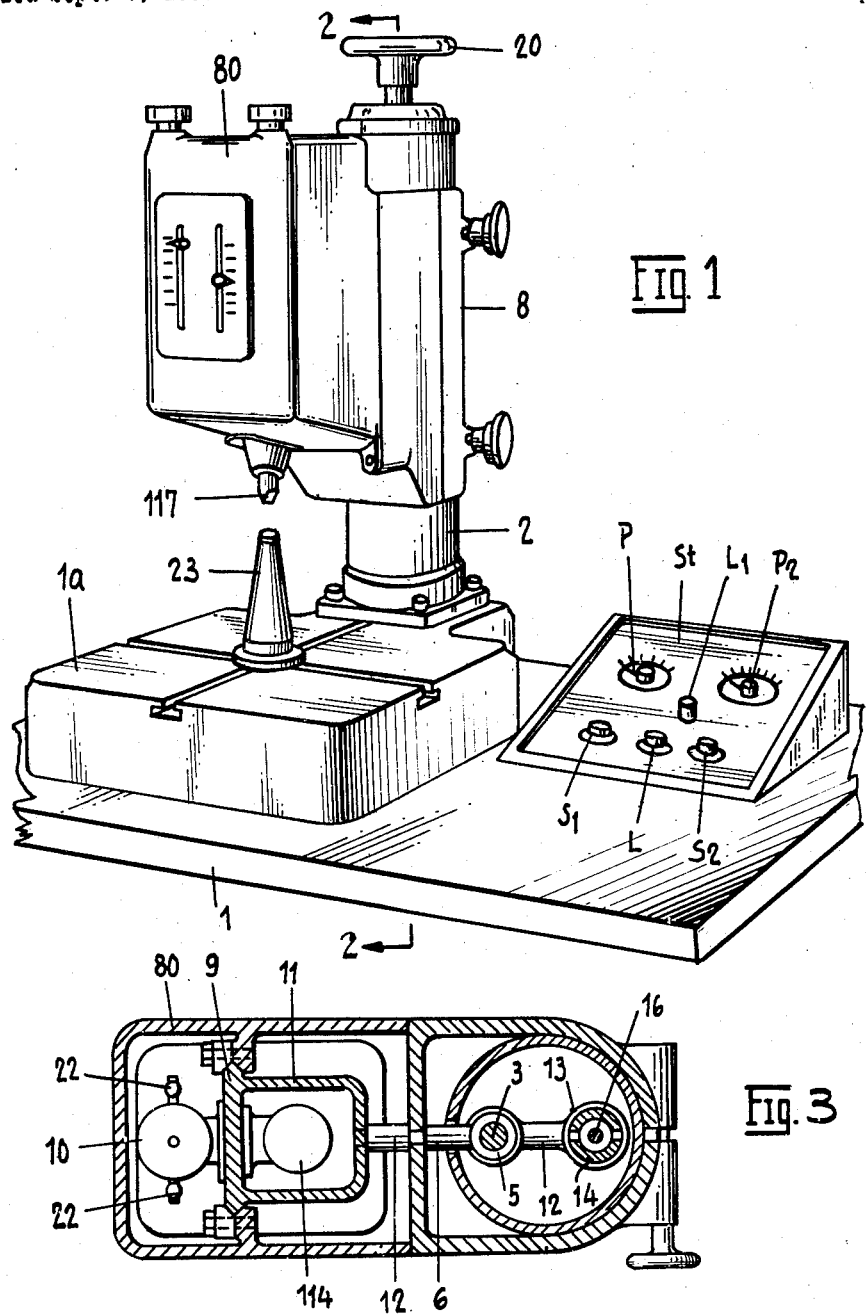
Fig. 1 is a perspective frontal view of the riveting machine as a whole.
Fig. 3 is a horizontal section on the line 3—3 of Fig. 2.

The riveting machine according to the invention comprises a stationary base plate 1 and a machine table 1a on which rests a cylindrical hollow column 2. In this cylindrical column 2 a threaded spindle 3 is journalled rotatably, to the upper end of which a gear pinion 4 is attached for rotation.

The screw thread of the spindle 3 is engaged by the internal screw thread of a sleeve nut 5 which carries a pin 6 projecting forwardly through a slot 7 in the mantle of the column 2 and which in turn carries a casing 8 in such a manner that this casing 8 can be moved up and down relative to the base 1 by appropriately turning the threaded spindle 3. In the casing 8 a carriage 9 is mounted slidably in the vertical direction on the frontal face of which the casing 10 of an electromagnetic vibrator and on the back of which the casing 11 of an electric motor are mounted, these casings 10 and 11 being accordingly fixedly connected to one another. The unit composed of the components 9, 10 and 11 is rigidly connected by a horizontal arm 12 to a screw threaded sleeve nut 13, the internal screw thread of which is engaged by the external screw thread of a hollow spindle 14, which is mounted in the column 2, parallel to the spindle 3, likewise rotatably, and adapted to be moved vertically up and down. The hollow spindle 14 has in its upper portion a diametrical slot 15 through its mantle through which a transverse pin 17 serving as a dog extends outwardly from a shaft 16 into which it is inserted. Between the transverse pin 17 and the head of the hollow spindle 14 a coiled spring 118 is inserted, and the upper end of the shaft 16 carries a gear pinion 18 which is constructed like the aforesaid gear pinion 4.

The two gear pinions 4 and 18 can be turned through a common driving pinion 19 by a hand wheel 20 whereby the two sleeve nuts 5 and 13 are moved at the same speed upwardly or downwardly, the two screw threads of the said spindles 3 and 14 having the same helical pitch. The hollow spindle 14 can, however, be pulled downwardly also by depressing a pedal 21 against the restoring force of a coiled spring 118, whereby the unit consisting of the components 9, 10, 11, 12 and 13 is lowered relative to the casing 8. A further tension spring 22 is arranged between the box shaped yoke 80 of the casing 8 and the vibrator casing 10, in order to assist the action of the spring 118.

With particular reference to Fig. 4 the construction of the vibrator and the manner of functioning thereof will now be explained.

The cylindrical vibrator casing 10 consisting of ferromagnetic material contains a coaxial internal cylinder 100 likewise of ferromagnetic material, and these two cylinders are connected with one another by a bottom 101 of ferromagnetic material. In the upper part of the internal cylinder 100 a ferromagnetic carrier nut 102 for a slide bearing bushing 103 is screwed-in, and in the lower part of the cylinder 100 a bushing piece 104 is screwed-in which likewise serves as a carrier of a slide bearing bushing 105. Between the components 102 and 104 a coiled spring 106 is clamped, the middle portion of which is connected by a transverse bridge 107 to a percussion member or vibrator rod 108, which is guided vertically movably in the axis of the vibrator casing 10. It carries at its upper end a slide bearing bushings 103 and 105 co-axially to the cap 109 of ferromagnetic material which overlaps the upper edge of the outer cylinder 10. A cylindrical solenoid winding Sp inserted between the cylinders 10 and 100 when passed by a current induces in the air gap 110 of the magnet system described hereinabove a magnetic field by the action of which the cap 109 and the vibrator rod 108 are pulled downwardly. The machine is adapted to operate at 50 or 100 cycles per second, and is operated at 50 cycles by means of a rectifier, and at 100 cycles by means of condensers.

In a head casing screwed to the underside of the bottom 101 a shaft 111 is mounted rotatably and vertically slidably. A belt pulley 112 fixedly mounted on the shaft 111 is driven by a belt 113 from a belt pulley 115 mounted on the output shaft of an electric motor 114 fitted into the motor casing 11, as long as this motor is energised.

A coiled spring 116 tends to keep the upper end of the shaft 111 apart from the head of the vibrator rod 108. In the lower end of the shaft 111 a riveter head 117 is inserted.

When a work piece W (Fig. 2), which lies on a support 23 mounted on the machine table 1a, is to be riveted, firstly the casing 8 is lowered by turning the handwheel 20 to such an extent that the riveter head 117 comes into a suitable distance from the work piece W. Later, foot pressure on the pedal 21 suffices for moving the vibrator 10 in the box shaped yoke 80 downwardly, the riveter head abutting firstly on the work piece, and the vibrator being subsequently lowered further, under compression of the spring 116, until the lower head of the vibrator rod 108 abuts on the constantly driven shaft 111 and imparts its vibrations through this shaft to the riveter head 117.

Since the riveter head 117 is not only set into vibration when operating, but is at the same time rotated, improved riveting is attained as compared with the known riveting machines.

According to the wiring diagram of Fig. 5, provision is made for the feeder circuit of the solenoid winding $Sp$ of the vibrator magnet system to contain a rectifier GR and a variable load resister $P_2$ for adjusting the current intensity as well as a control switch K governed by a time control unit T. As a time control unit T here a thyratron arrangement is used which is controllable by adjustment of a potentiometer $P_1$ and having a relay $R1s$ which is associated to the switch K. For switching the time control unit T on, two mutually parallel connected double pole switches $S_2$ and $S_3$ are provided, the first one of which can be switched on by hand at H, while the other one is coupled to the pedal 21. The double pole main switch $S_1$ serves for the energising of the feeder transformer $Ue$ for the supply of the time control unit and of the winding, and for switching on at the same time the motor 114. A signal lamp $L_1$ indicates whether the main switch S is closed, and a table illuminating lamp $L_2$ can be switched on by closing the switch $S_4$.

The machine can accordingly be set into a state of readiness for operation by closing the main switch $S_1$. The period of vibration desired can be adjusted on the potentiometer P, while the vibrator output can be adjusted by varying the load resistor $P_2$. When subsequently the rotating riveter head 117 contacts the work piece W, the switch $S_3$ may be closed by completely depressing the pedal 21, so that the winding $Sp$ is supplied with periodical current peaks until by the time control unit or the relay thereof the switch K is opened.

In order that the electric control elements may not be exposed to the vibrations of the vibrator the same are built into a control casing $St$ mounted separately on the base plate 1 outside the range of vibrations of the vibrator.

While I have herein described and illustrated in the accompanying drawings what may be considered a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent, is:

A riveting machine comprising in combination: a machine base, a hollow pillar fixedly mounted on top of said base, two vertical threaded spindles having equal helical pitch both rotatably journalled in and axially restrained relative to the said pillar, first adjustment means rotatably mounted in the said pillar and operatively connected to both the said threaded spindles and when operated driving the same at equal rotational speed, an outer casing slidably mounted parallel to the said threaded spindles on the said pillar, a screw-tapped nut in screw-engagement with one of the said threaded spindles freely slidable axially but restrained rotationally relative to the said pillar and rigidly connected to the said outer casing, a carriage, a second screw-tapped nut in screw-engagement with the other one of the said threaded spindles, freely slidable axially but restrained rotationally relative to the said pillar and rigidly connected to the said carriage, second adjustment means pivotally mounted on the said base and operatively connected to the said other threaded spindle and when operated pulling the same downward together with the said second nut and the said carriage, spring means biasing the said other threaded spindle upwardly, a rotational motor and a vibrator mounted in the said carriage, and a riveting tool slidably and rotatably mounted in the said carriage and operatively connected to the said rotational motor and vibrator and in operation rotated and vibrated by the same.

References Cited in the file of this patent
UNITED STATES PATENTS

| | | |
|---|---|---|
| 1,110,285 | Brixius | Sept. 8, 1914 |
| 1,113,900 | Jackson | Oct. 13, 1914 |
| 1,910,954 | Knuuti | May 23, 1933 |
| 1,928,653 | McEvoy | Oct. 3, 1933 |
| 2,323,440 | Baird | July 6, 1943 |
| 2,581,806 | McShirley | Jan. 8, 1952 |